UNITED STATES PATENT OFFICE.

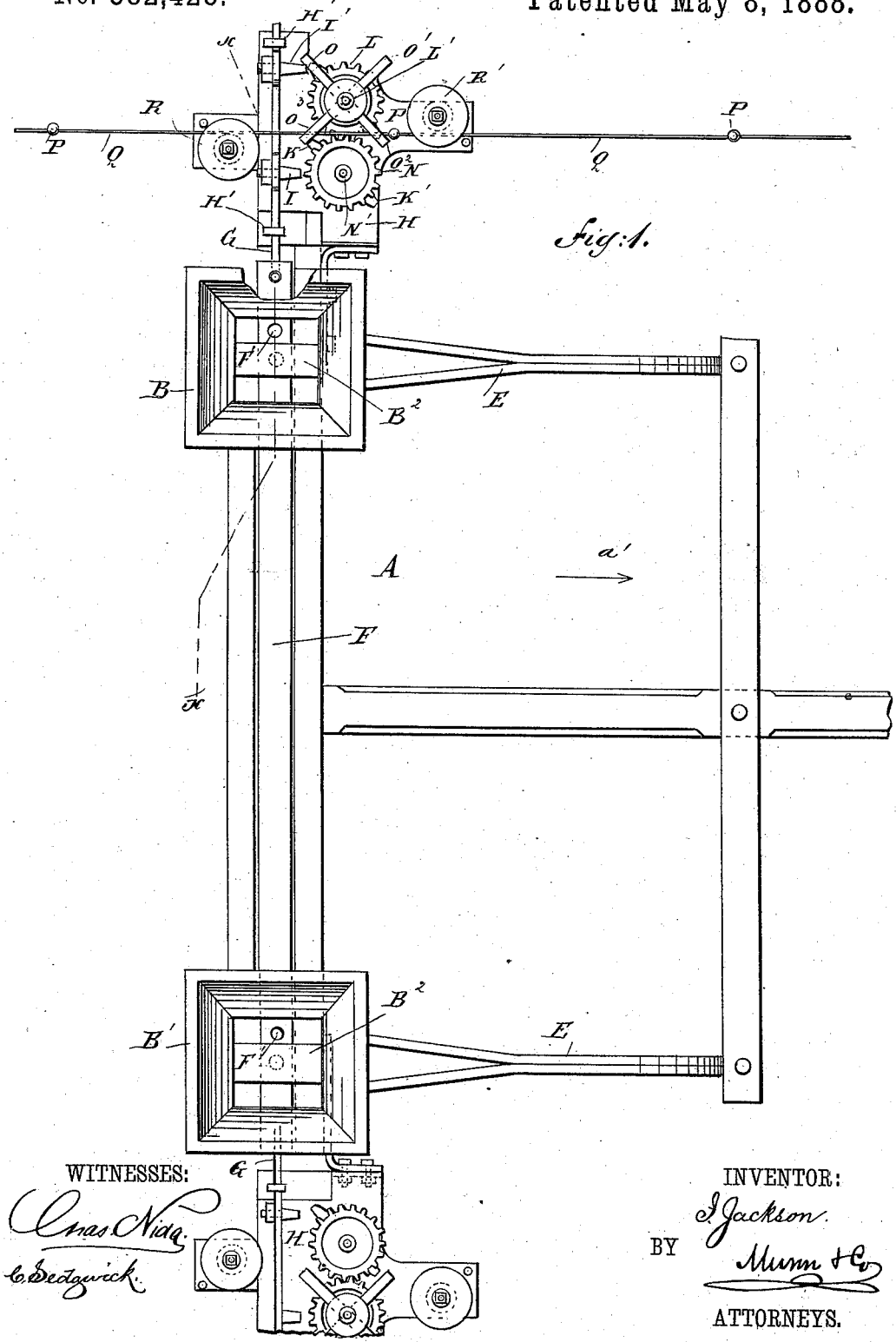

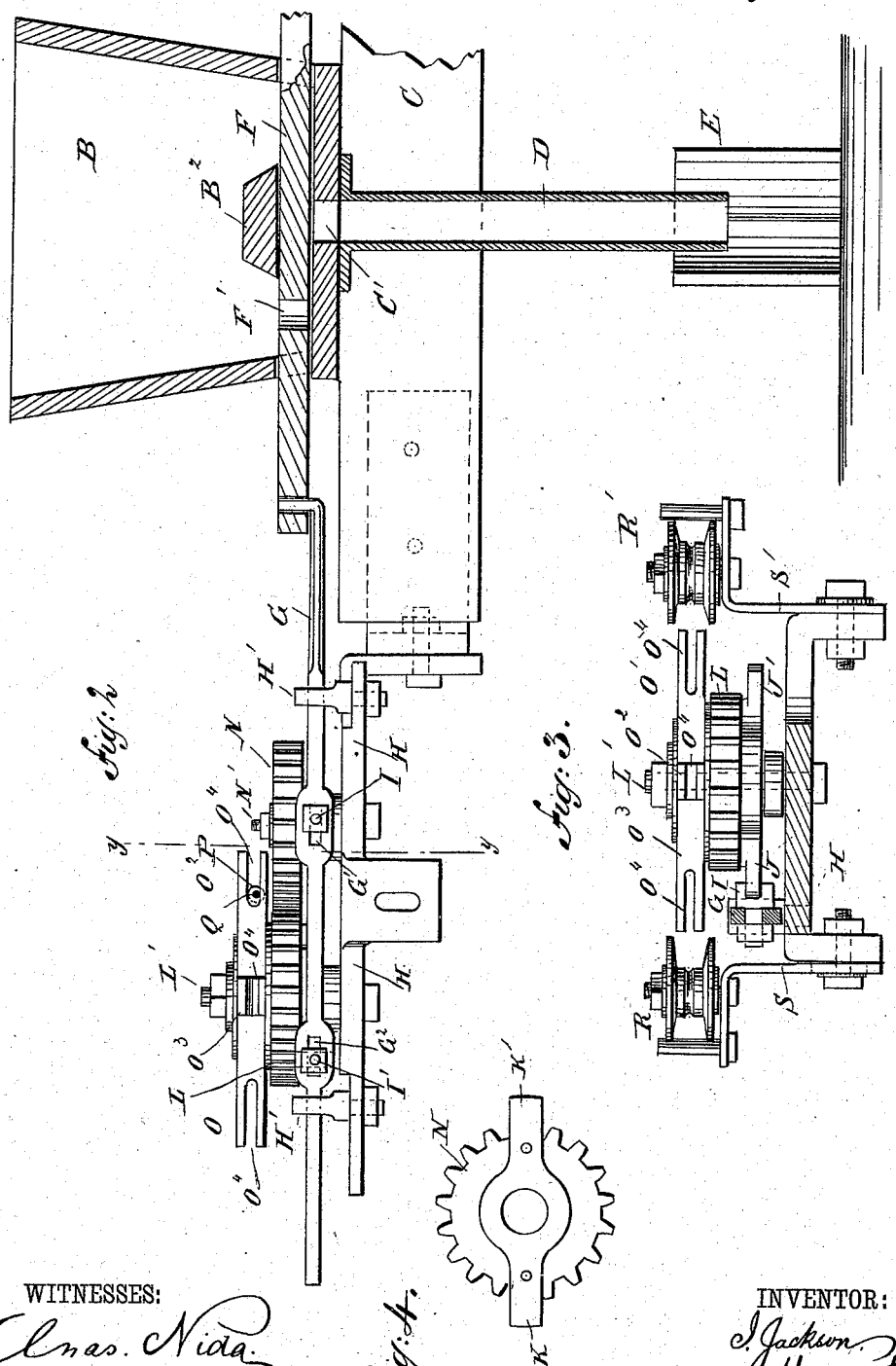

ISAAC JACKSON, OF KINGMAN, KANSAS.

CHECK-ROW ATTACHMENT FOR PLANTERS.

SPECIFICATION forming part of Letters Patent No. 382,428, dated May 8, 1888.

Application filed February 29, 1888. Serial No. 265,709. (No model.)

*To all whom it may concern:*

Be it known that I, ISAAC JACKSON, of Kingman, in the county of Kingman and State of Kansas, have invented a new and Improved Check-Row Attachment for Planters, of which the following is a full, clear, and exact description.

The object of the invention is to provide an improved check-row attachment for planters which is very simple and durable in construction and very effective in operation.

The invention consists of certain parts and details and combinations of the same, as will be fully described hereinafter, and then pointed out in the claims.

Reference is to be had to the accompanying drawings, forming a part of this specification, in which similar letters of reference indicate corresponding parts in all the figures.

Figure 1 is a plan view of the improvement as applied. Fig. 2 is an enlarged sectional end elevation of the same on the line $x\ x$ of Fig. 1. Fig. 3 is a sectional side elevation of the same on the line $y\ y$ of Fig. 2, and Fig. 4 is a plan view of part of the improvement.

The planter A, of any approved construction, is provided with the usual seed-boxes, B and B', each having a bottom, C, provided in its middle with an aperture, C', registering with the downwardly-extending tube D, fastened to the underside of the bottom C and extending into the furrow-opener or runner E of the planter A. In the seed-boxes B and B' is held to slide transversely on the bottom C a bar, F, provided with the apertures F' in each of the boxes B and B', in such a manner that the apertures F' in the seed-boxes B register or disconnect simultaneously with the apertures C' in the bottom C of the said box B, so that the grain is dropped simultaneously in both boxes.

Each end of the bar F is connected by a bar, G, which is a part of the check-row attachment and which extends from each of the seed-boxes E and E', and as the sides are alike it suffices to describe only one. The rod G is mounted to slide transversely in the bearings H' H', fastened on the frame H, secured to the main frame of the planter A, next to the respective seed-box B or B'. The rod G is provided between the bearings H' H' with slots G' and G², in which are held adjustably the lugs I and I', respectively, adapted to be engaged alternately by the arms J J' and K K', fastened to the under sides of the wheels L and N, mounted to rotate on studs L' and N', respectively, secured to the frame H of the check-row attachment.

The arms J and J' are placed in a diametrical line, and the arms K and K' are placed similarly, the arms J J' and K and K' being placed in such relative positions that when the arms J J' stand parallel with the rod G the other arms, K K', stand at right angles to the same, and vice versa. The gear-wheels L and N are in mesh with each other and are of the same diameter, so that when one wheel makes one revolution the other also makes one revolution.

On top of the gear-wheel L are secured the four radial arms O, O', O², and O³, placed equal distances apart and each being provided near its outer end with a slot, O⁴, through which can pass a rope or wire, Q, provided with the usual balls or knots, P, which are somewhat larger in diameter than the heights of the slots O⁴, so that the said balls P cannot pass through the slots O⁴. The rod or wire Q is fastened by its ends in the usual manner in the field in which the planter is operating, and the said rope or wire Q is guided to the arms O, O', O², and O³ by the guide-pulleys R and R', mounted to rotate on suitable studs secured to the arms S, fastened on the frame H of the check-row attachment.

The operation is as follows: The rope or wire Q is secured in the field in the usual manner, and one of the check-row attachments of the planter A is guided along the said rope Q in the manner shown in Fig. 1—that is, the rope Q is guided by the pulleys R and R' and passes alternately through the slots O⁴ of the arms O, O', O², and O³, so that whenever one ball P comes in contact with one of the said arms as the planter A is moving forward in the direction of the arrow $a'$ a rotary motion is imparted to the gear-wheel L until the respective arm O, O', O², or O³ has assumed such a position that the ball P has passed the outer end of the respective arm O, O', O², and O³. The next arm is then operated on by the next following ball P whenever the latter comes in contact with the said arm, as before described. The seed-boxes B and B' are filled in the usual manner with the seed to be planted, and when the planter A is moved forward, as above described, and the gear-wheel L is turned by the action of the balls P on the arms O, O', O², and O³, the gear-wheel N is also turned and the respective arms J K and J' K' act alternately on the lugs I and I', so that the rod G is moved alternately outward and inward, whereby a sliding motion is imparted to the bar F, the apertures F' of which register with the apertures C' in the bottoms C of the boxes B and B'. The grain in the boxes B and B' passes into the aperture F' whenever the latter does not register with the respective aperture C', but is open and out of contact with the cross-piece B², secured in each box directly above the respective aperture C' in the bottom, as shown in Fig. 2. Then the grain from the respective box B or B' passes into the said aperture F', and at the next sliding movement of the bar F is carried to the aperture C' and dropped into the latter, so that the grain falls through the tube D into the runner or plow E and is deposited into the furrow. As the balls P are placed at regular intervals on the wire or rope Q, it will be seen that the arms O, O', O², and O³ are operated on at regular intervals, and consequently the sliding bar F is moved regularly, so that the grain is dropped at regular intervals in the furrow made by the runners E E.

The stroke of the bar G can be increased or diminished by adjusting the lugs I and I' in the slots G' and G² of the said rod G, so that it requires a longer or shorter time for the apertures F' to register with the apertures C'. It is understood that the arms J J' on the gear-wheel L impart an outward movement to the bar G, and the arms K K', fastened on the gear-wheel N, impart a like inward movement to the said bar G.

When the check row attachment on the box B is in operation with the cord Q, as shown in Fig. 1, then the check-row attachment next to the box B' is idle and at a standstill. When the planter A is at the end of the field, it is turned in the usual manner and is disconnected from the cord Q, after which the cord Q is changed to the next row and again connected with the respective check-row attachment on the box B or B', according to the direction in which the planter is traveling. Thus it will be seen that the planter A can be used in either direction.

Having thus described my invention, what I claim as new, and desire to secure by Letters Patent, is—

1. In a check-row attachment for planters, the combination, with the seed-boxes and an apertured plate held to slide through the said seed-boxes, of a rod connected to the end of the said plate and provided with lugs, arms adapted to engage alternately the said lugs to impart a sidewise sliding movement to the said rod and plate, gear-wheels carrying the said arms and held in mesh with each other, and slotted arms secured to one of the said gear-wheels and adapted to be operated upon by the balls or knots of the check-row cord or wire, substantially as shown and described.

2. In a check-row attachment for planters, the combination, with the check-row rope or wire provided with balls or knots, of slotted arms adapted to be operated on by the said rope or wire, and two gear-wheels held in mesh with each other, one of the gear-wheels carrying the said slotted arms, one diametrical arm secured on each of the said gear-wheels and adapted to impart movement to the drop of the seed-boxes, substantially as shown and described.

3. In a check-row attachment for planters, the combination, with the check-row rope or wire provided with balls or knots, of slotted arms adapted to be operated on by the said rope or wire, two gear-wheels held in mesh with each other and one carrying the said slotted arms, one diametrical arm secured on each of the said gear-wheels, lugs operated on alternately by the said diametrical arms of the gear-wheels, a rod mounted to slide laterally and carrying the said lugs, and an apertured sliding bar connected with the said rod and operating transversely in the seed-boxes, substantially as shown and described.

4. In a check-row attachment for planters, the combination, with the check-row rope or wire provided with balls or knots, of slotted arms adapted to operate on the said rope or wire, two gear-wheels held in mesh with each other and one carrying the said slotted arms, one diametrical arm secured on each of the said gear-wheels, lugs operated on alternately by the said diametrical arms of the gear-wheels, a rod mounted to slide laterally and carrying the said lugs, an apertured sliding bar connected with the said rod and operating transversely in the said box, and pulleys for guiding the said rope or wire to the said slotted arms, substantially as shown and described.

ISAAC JACKSON.

Witnesses:
NATHAN J. BLAKE,
J. F. BATES.